(12) United States Patent
Lin et al.

(10) Patent No.: US 6,484,970 B2
(45) Date of Patent: Nov. 26, 2002

(54) BALLISTIC SHIELD FOR DUAL ENGINE SINGLE OUTPUT SHAFT PROPULSION SYSTEM

(75) Inventors: Hersheng Lin, Chandler, AZ (US); Shen-yeh Chen, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 57 days.

(21) Appl. No.: 09/816,598

(22) Filed: Mar. 22, 2001

(65) Prior Publication Data

US 2002/0134887 A1 Sep. 26, 2002

(51) Int. Cl.[7] ................................................. B64C 1/10
(52) U.S. Cl. ...................................................... 244/121
(58) Field of Search ........................ 150/157; 244/53 R, 244/121, 54, 129.1, 122; 74/661, 665 R, 665 B (56) References Cited

U.S. PATENT DOCUMENTS

| | | | |
|---|---|---|---|
| 3,241,813 A | | 3/1966 | Von Flue et al. |
| 3,564,937 A | * | 2/1971 | Soloviev et al. ............... 74/661 |
| 4,022,083 A | | 5/1977 | Pollak-Banda et al. |
| 4,106,603 A | | 8/1978 | Walter |
| 4,118,997 A | * | 10/1978 | Woodward et al. ........... 74/417 |
| 4,177,693 A | | 12/1979 | Ivanko et al. |
| 4,425,080 A | | 1/1984 | Stanton et al. |
| 4,481,841 A | | 11/1984 | Abthoff et al. |
| 4,500,054 A | * | 2/1985 | Osborn ....................... 180/69.6 |
| 4,531,694 A | | 7/1985 | Soloy |
| 4,534,698 A | | 8/1985 | Tomich |
| 4,547,122 A | | 10/1985 | Leech |
| 4,598,449 A | | 7/1986 | Monhardt et al. |
| 4,705,454 A | | 11/1987 | Bouiller et al. |
| 4,829,850 A | | 5/1989 | Soloy |
| 5,114,098 A | * | 5/1992 | Campbell .................... 150/157 |
| 5,273,393 A | | 12/1993 | Jones et al. |
| 5,747,721 A | * | 5/1998 | Speakes et al. .............. 244/121 |
| 5,954,479 A | | 9/1999 | Smith |
| 6,206,155 B1 | * | 3/2001 | Schneider .................... 188/376 |

* cited by examiner

*Primary Examiner*—Peter M. Poon
*Assistant Examiner*—Kevin Jakel
(74) *Attorney, Agent, or Firm*—Robert Desmond, Esq.

(57) ABSTRACT

A ballistic shield containment system for preventing fragments expelled from an engine assembly from penetrating the casing of an adjacently disposed engine is provided. In a turboprop engine assembly having two power sections connected through a combining gearbox to a single propeller shaft, it is imperative that failure of the rotor disks in one engine not cause failure of the remaining engine. A substantially rectangular shaped panel member is supported at approximately the mid-point between the power sections by a support truss system extending from the panel to a space frame. The space frame is supported by a separate truss system connected to fixed bulkhead. The panel includes reinforcing ribs to prevent fragment penetration and excessive deformation. Each of the truss members is attached at either end to a spherical bearing capable of transmitting force loads while preventing transmission of moment loads.

20 Claims, 7 Drawing Sheets

BALLISTIC SHIELD FOR DUAL ENGINE SINGLE OUTPUT SHAFT PROPULSION SYSTEM

BACKGROUND OF THE INVENTION

The present invention generally relates to a propulsion system wherein two high speed turboshaft engines are disposed side-by-side and employed to drive a single output shaft and, more particularly, to a ballistic shield containment system positioned between the engines to prevent rotor burst in one of the engines from adversely impacting the other turboshaft engine.

The principal drawback of a single engine aircraft resides in the almost inevitable result that engine failure will cause the aircraft to crash. For this reason, federal law has long prohibited the carrying of passengers for hire in single engine, propeller-driven fixed wing aircraft. Rather, commercial aircraft that carries passengers must utilize at least two separate engines, allowing one engine to continue to propel the aircraft even if the other engine should fail.

While multiple engines add a considerable and necessary level of safety to operation of the aircraft, they also significantly add to the cost of the aircraft. For small airlines, the expense of the aircraft including the expense of the separate engine assemblies can be the primary factor as to whether the airline can be commercially successful.

In an effort to provide an economical alternative to the need for aircraft employing completely separate engine assemblies, the concept has been put forth of employing dual aircraft engine power sections to drive a single propeller shaft through connections of the engine output shafts to a common gearbox. If one of the engine assemblies should fail, the remaining engine assembly will provide sufficient propulsion. Such a multi-engine, single propeller propulsion system is shown in Soloy, U.S. Pat. No. 4,829,850. The engines drive a single propeller and are separated by a firewall. There is no suggestion in Soloy of utilizing a containment system designed to withstand the serious type of engine failure referred to, by those skilled in the art, as rotor burst. Nor is there any teaching of a detailed attachment/suspension system capable of transmitting forces impacting against the firewall without transmitting any moment loads.

In rotor burst, the compressor or turbine disk breaks apart into portions, which may be as large as a third the size of the disk. These portions typically travel at speeds of up to 450 miles per hour and can easily breach conventional gas turbine engine firewalls. For example, the kinetic energy associated with a rotor burst of a first stage compressor impeller where the fragment is about ⅓ the size of the disk is on the order of 859,040 in-lbf. In comparison, a blade fragment from a first stage compressor impeller has a kinetic energy of about 28,719 in-lbf. For a second turbine stage, the burst fragment may have kinetic energy of about 406,770 in-lbf while the blade fragment 16,973 in-lbf. It is evident that the damage created by rotor burst has the potential for causing extreme damage and even complete failure to an adjacently disposed engine assembly regardless of the presence of a conventional firewall as taught in Soloy.

Because of the danger of fragments from one engine section damaging the remaining engine section, certification for the multi-engine, single propeller shaft design basically requires demonstration that failure of one engine section will not create a hazard to the remaining engine section.

As can be seen, in order to certify a two engine section assembly for commercial passenger use, there is a need for a ballistic shield containment system that ensures continuous power is available from one of the two power sections in the event of an uncontained rotor failure in the other power section. Such a containment system must be able to withstand the impact of fragments generated by all types of engine failure up to, and including, rotor burst.

SUMMARY OF THE INVENTION

In one aspect of the present invention, a ballistic shield is formed as a substantially rectangular panel member having a uniform thickness of approximately ½ inch and preferably formed of metallic material possessing an optimal combination of strength and ductility and low weight density, for example titanium alloy Ti-6-4. The shield has a number of features which combine to resist fragment penetration and excessive deformation and displacement, on the order of 2–3 inches total deformation and displacement relative to the unaffected power section, caused by any type of structural failure including rotor blast. The features include a reinforcing lip mounted on the periphery of the shield which extends outwardly beyond each face of the panel member. In addition, reinforcing ribs are strategically located to extend outwardly from each face of the shield to reinforce specific panel areas where fragments may have the greatest force of impact. The ballistic shield extends in a generally vertical direction approximately equal distance between the two power sections on the same plane as the propeller shaft.

The ballistic shield is supported by a support truss system, which is attached to a multi-part space frame assembly. The space frame, in turn, is connected by a separate space truss system to fixed support assembly such as an aircraft's forward bulkhead structure. All primary support joints between the ballistic shield and its supporting truss system incorporate spherical bearings to assure that while direct force loads are transmitted through the joints, there will be no transmission of moment loads. Secondary support joints of the ballistic shield are bolted directly to its supporting structure to provide a degree of dynamic frictional damping.

In another aspect of the invention, a turboprop engine assembly including multiple engine power sections driving a single propeller shaft is protected and supported by a multi-part space frame assembly. A ballistic shield is supported by the space frame at a location approximately mid-point between the engine power sections in the same plane as the single propeller shaft. A truss system connects the ballistic shield to the space frame and a separate truss system connects the space frame to the aircraft's forward bulkhead.

These and other features, aspects and advantages of the present invention will become better understood with reference to the following drawings, description and claims.

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
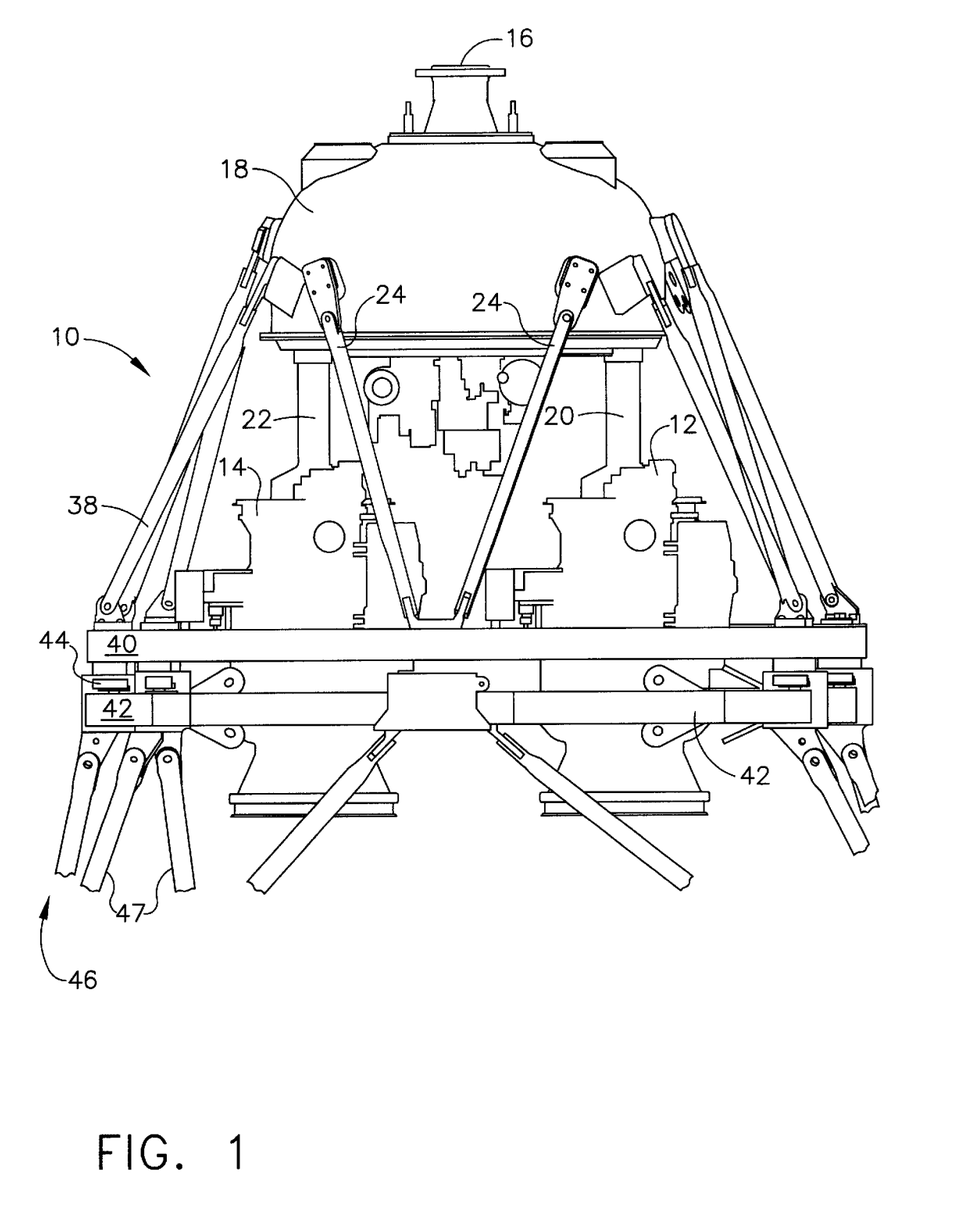
FIG. 1 is a top view of a turboprop engine assembly including two power sections and a single propeller shaft formed in accordance with a preferred embodiment of the present invention.

FIG. 1 is a top view of a turboprop engine assembly 10 including a pair of similar power sections 12 and 14 driving a single, nose-mounted propeller shaft 16. Each of the power sections 12 and 14 comprises a complete turboshaft gas turbine engine. A combining gearbox 18 joins each power section 12 and 14 with a common propeller shaft 16.

Figure 2:
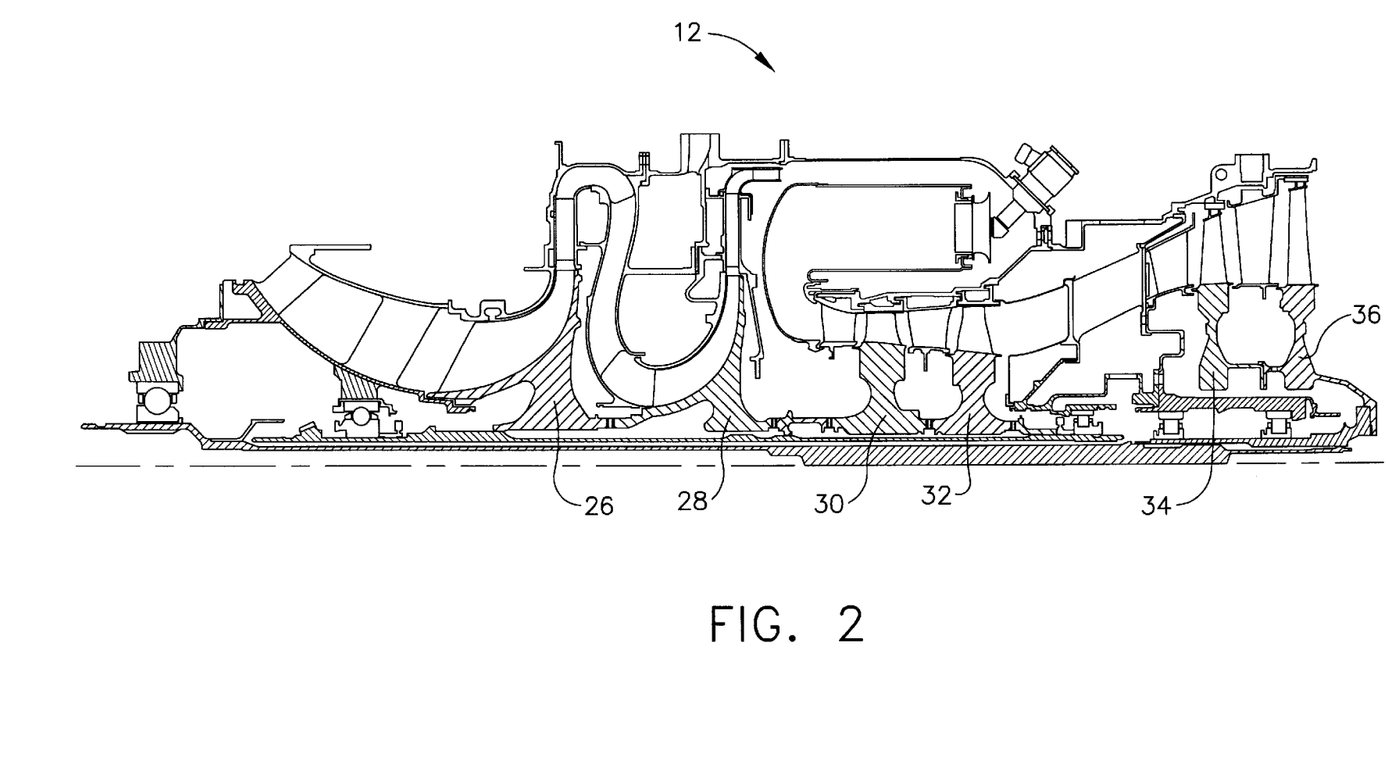
FIG. 2 is a cross-section of a turboshaft engine typical for the two power sections formed in accordance with FIG. 1.

Referring now to FIG. 2, a cross-sectional view of the power section 12 (as being illustrative of both power sections 12, 14) is shown to include the high speed rotors comprising a first impeller stage 26, a second stage impeller 28, a first gas-generator turbine stage 30, a second stage gas-generator turbine 32, a first stage power turbine 34, and a second stage power turbine 36. The operation of gas turbine engines 12 and 14 are conventional in nature and therefore are not explained in detail. The two power sections 12 and 14 are each joined to the common combining gearbox 18 by torque tubes 20 and 22, respectively, and a support cradle assembly 24.

Figure 4:
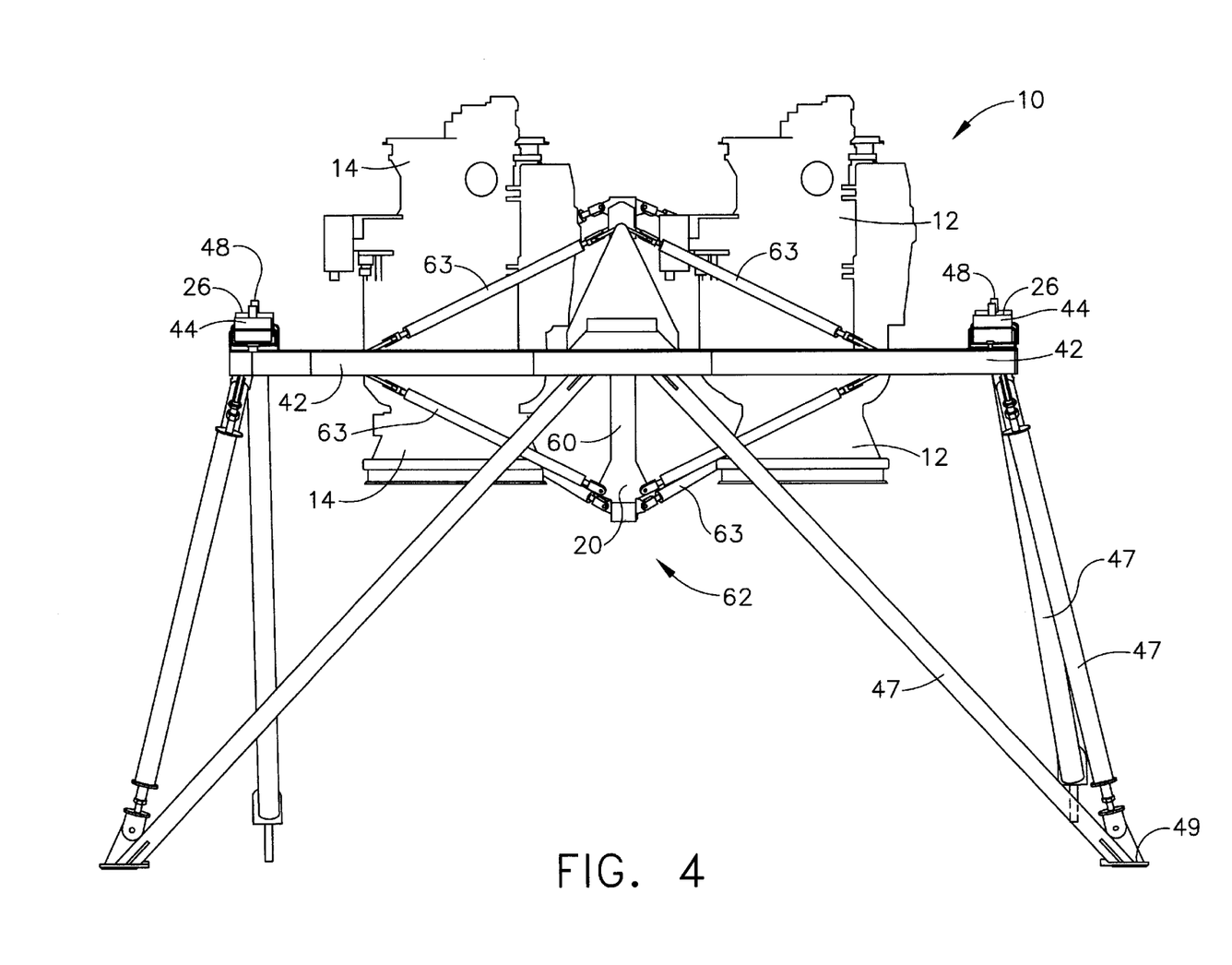
FIG. 4 is a top view of the power sections assembly of FIG. 1, showing the ballistic shield containment system of FIG. 3.

The combining gearbox 18 is, itself, supported by a system of trusses 38 to a forward space frame 40 having a curved shape substantially similar to that of a horse collar. A second, similarly shaped aft space frame 42 is attached to space frame 40 via a system of elastomeric isolators 44. The isolators 44 may take the form of disks formed of elastomeric material, as shown in FIG. 4, having through openings to allow connecting bolts 48 to pass through and draw space frames 40 and 42 into compressive engagement against opposite faces of each elastomeric disk.

Figure 3:
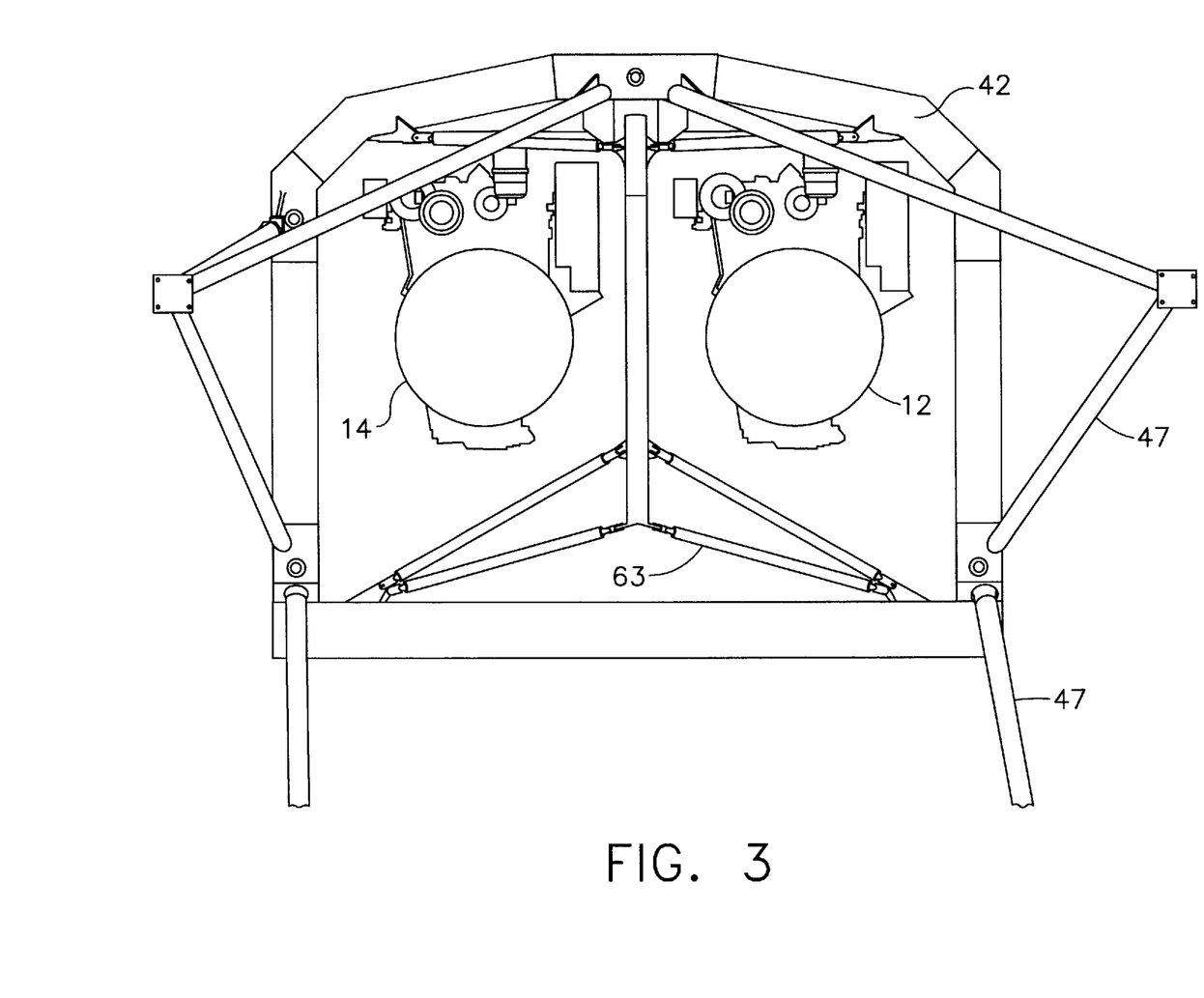
FIG. 3 is an end view of the power sections of FIG. 1, including a ballistic shield containment system formed in accordance with a preferred embodiment of the present invention.
Figure 8:
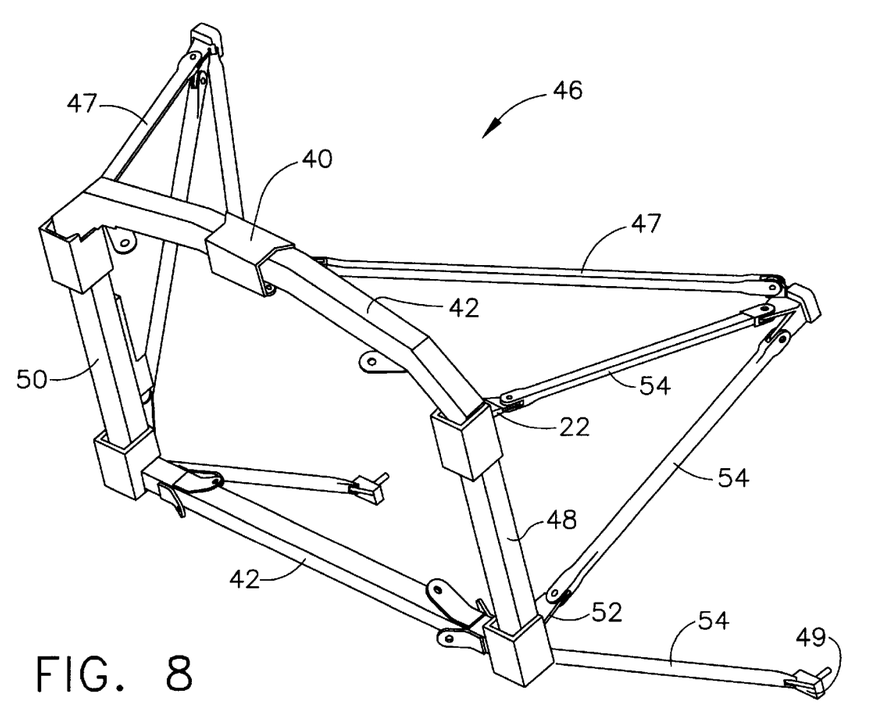
FIG. 8 is a perspective view of the support truss system adaptable for mounting the aft space frame to the forward bulkhead of an aircraft.

Aft space frame 42 is adaptable to being anchored to the forward bulkhead of an aircraft, not shown, by a space frame truss system 46 including a plurality of separate trusses 47, as shown in FIGS. 3 and 8. At least some of the anchor points for the trusses 47 may include spherical bearings 49 to ensure that moment loads are not transmitted between the truss members 47 and the bulkhead.

During operation of an aircraft employing engine assembly 10, each of the power sections 12 and 14 continuously rotates at a high rate in order to jointly rotate the propeller shaft 16 through gearbox 18. For whatever reason, if rotor disks 26–36 formed with blades in either of the power sections 12 or 14 suddenly fail and burst, disk fragments possessing very high levels of kinetic energy will be released from the failed power sections 12 or 14. It has been determined that the most energetic fragments are released when rotors 26–36 burst into fragments approximately one-third the size of the rotor disk. As a plurality of such fragments burst through the casing of either of the power sections 12 or 14, some of the fragments will inevitably be directed toward the remaining power section. If not contained, these fragments can easily penetrate the casing of the undamaged power section, causing damage, if not complete failure of the remaining power section and ultimately failure of engine assembly 10.

The present invention provides a unique containment system supported by the pair of horse collar shaped space frame members 40 and 42 that is capable of preventing any fragments generated during engine failure, including rotor burst, from reaching the remaining power section.

Figure 7:
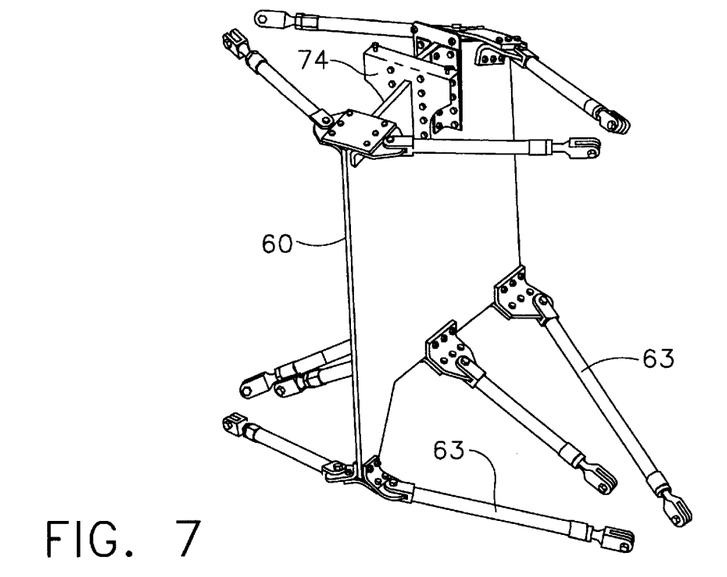
FIG. 7 is a perspective view of the ballistic shield of FIG. 6b with attached support trusses.

Attention is directed to FIG. 4, wherein a ballistic shield 60 extends between power sections 12 and 14. Shield 60 is substantially flat and is disposed in a vertical plane located approximately at the mid-point of the distance between engine power sections 12 and 14. Preferably, shield 60 lies in the same plane as the common propeller shaft 16 as shown in FIG. 1. To retain shield 60 in position, a truss system 62 is shown in FIG. 4 to extend between shield 60 and aft space frame 42. A number of separate trusses 63 are each shown in FIG. 7 as being attached to the periphery of ballistic shield 60. Each of the trusses 63 is adaptable to also being attached to aft space frame 42.

Figure 5:
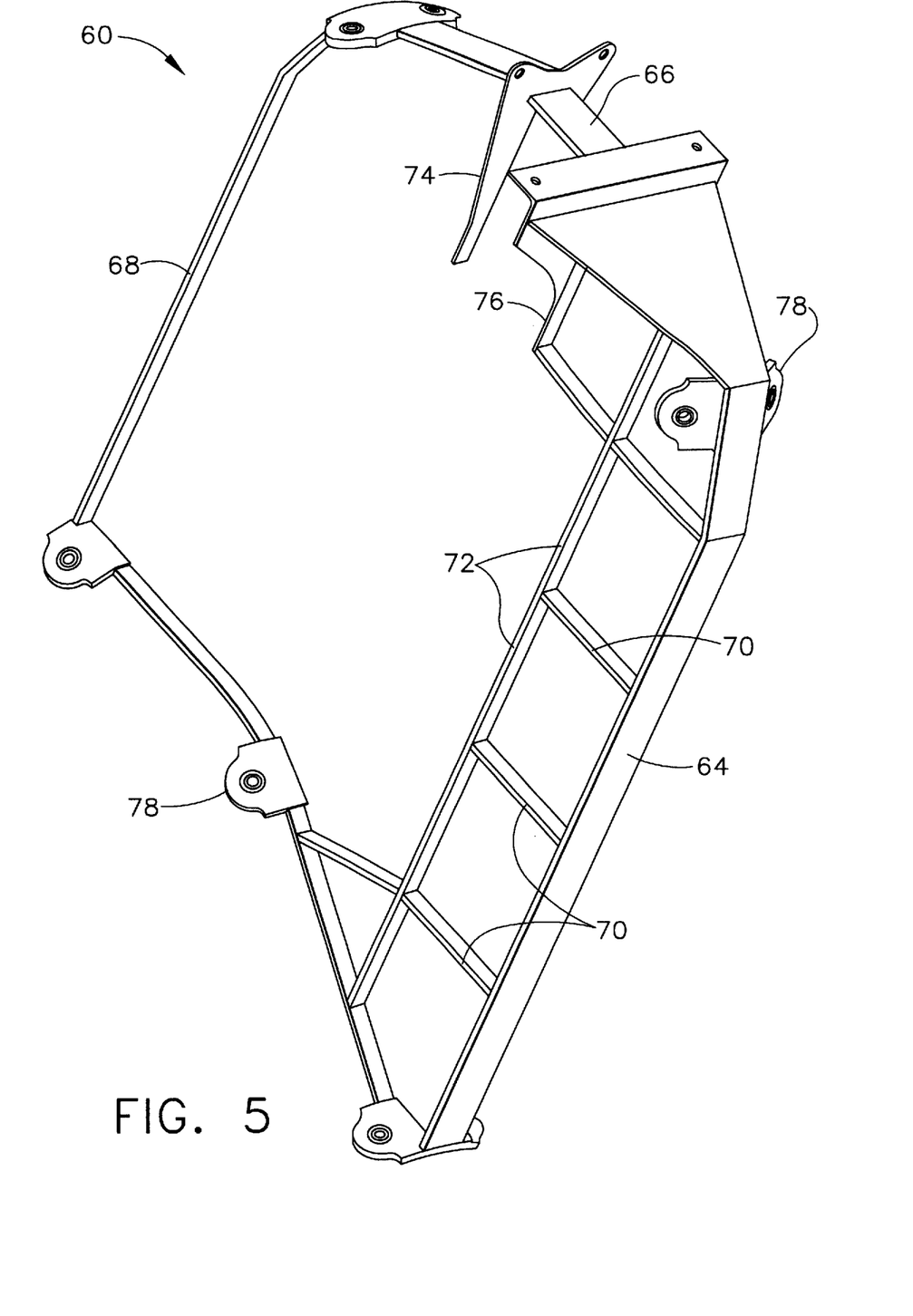
FIG. 5 is a perspective view of a preferred embodiment of the ballistic shield as employed in the containment system of FIG. 3.

A preferred embodiment of ballistic shield 60 is shown in FIG. 5 to comprise a panel member of substantially rectangular configuration. A leading or forward surface of shield 60 is shown at 64 while topside of shield 60 is identified at 66. Shield 60 further includes overhanging ridge or lip 68 extending completely about its periphery. Lip 68 extends outwardly beyond opposite faces of shield 60 and serves to reinforce shield 60 to resist penetration and excessive deformation from impact of high speed fragments.

Shield 60 may include a plurality of spaced-apart ribs 70 extending substantially parallel to each other from the leading surface 64. Individual ribs 70 extend outwardly from both sides of shield 60 and may be connected by additional ribs 72. Additional reinforcing ribs and secondary attachments 74 and 76 may extend through the face from topside 66 to provide additional reinforcement to both faces of shield 60. The secondary attachments 74 and 76 are bolted directly to the aft space frame 42 to provide a level of dynamic frictional damping.

In a preferred embodiment, ballistic shield 60 is formed of a metallic material of significant strength, about 142 ksi tensile strength, and ductility capable of about 16% elongation and low weight density of about 0.16 lbs per cubic inch, such as present in the titanium alloy Ti-6-4. Shield 60 may have leading and trailing edges each approximately 30 inches in length and top and bottom edges each may extend approximately 26 inches in length. The primary attachment members may take the shape of tongues 78 located about the periphery of shield 60. Each attachment tongue 78 may include at least one spherical bearing 49 to assure moment loads are not transmitted between shield 60 and trusses 63.

Figure 6A:
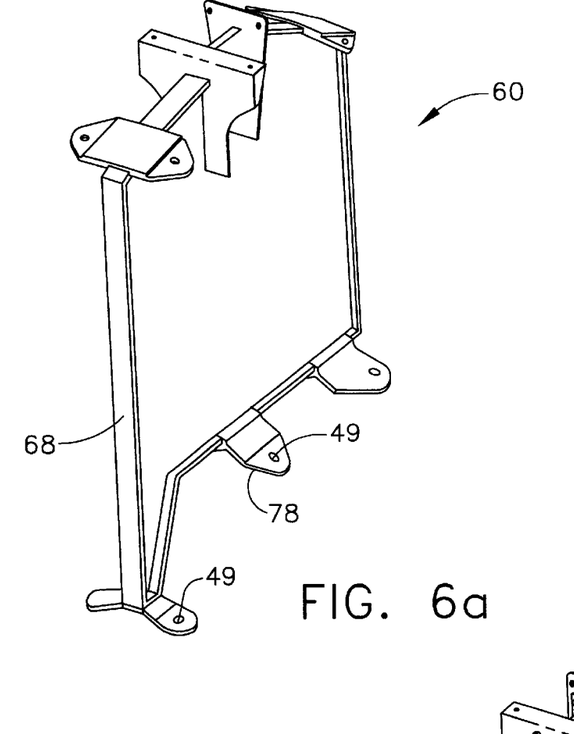
FIGS. 6a and 6b are perspective views of further embodiments of the ballistic shield as employed in the containment system of FIG. 3.
Figure 6B:
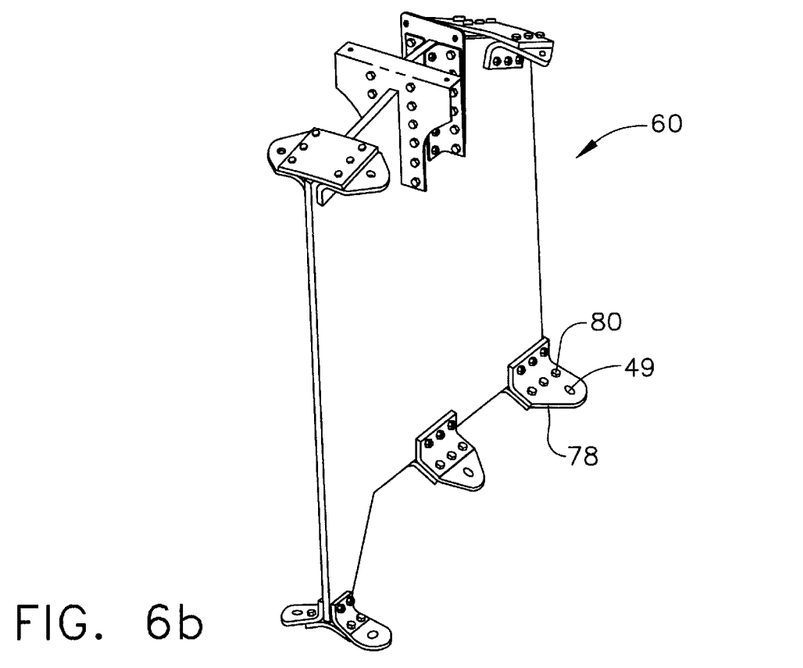

Alternative embodiments of the ballistic shield are shown in FIGS. 6a and 6b, respectively. In the embodiment shown in FIG. 6a, shield 60 does not include any reinforcing ribs. The lip 68 may extend outwardly in both directions beyond the periphery of shield 60. Further, the spherical bearing attachment members 78 are the primary points of contact with shield 60.

In the embodiment shown in FIG. 6b, shield 60 may be a flat panel member without any reinforcing ribs or lip. Each of the tongue shaped attachment members 78 may include a single spherical bearing 49 as well a number of conventional bolt attachment members 80.

It should be understood, of course, that the foregoing relates to preferred embodiments of the invention and that modifications may be made without departing from the spirit and scope of the invention as set forth in the following claims.

We claim:

1. A ballistic shield containment system for preventing fragments expelled from a first engine from adversely impacting a second engine, comprising:
   a ballistic shield;
   a space frame assembly surrounding said ballistic shield and adaptable to being attached to a bulkhead; and
   a ballistic shield support truss system including a plurality of separate support truss members, with each truss member attached at one end to said ballistic shield and attached at an opposite end to said space frame assembly, whereby the support truss system retains said ballistic shield at approximately a mid-point between said first and second engines;
   wherein the ballistic shield includes a plurality of reinforcing ribs extending outwardly from at least one face of the ballistic shield at a location near an edge of the shield to reinforce the shield against fragment penetration and excessive deformation caused by fragment impact from either of the engines.

2. The containment system according to claim 1, wherein the ballistic shield is formed of substantially uniform thickness.

3. The containment system according to claim 2, wherein the ballistic shield has a substantially uniform thickness in the range of about 0.5 to 0.6 inches.

4. The containment system according to claim 2, wherein the ballistic shield is formed of a metallic material having an optimal combination of strength, ductility and low weight density.

5. The containment system according to claim 4, wherein the ballistic shield is formed of the titanium alloy Ti-6-4.

6. The containment system according to claim 1, wherein the plurality of reinforcing ribs extend outwardly from opposite faces of the ballistic shield at locations near an end of the shield.

7. The containment system according to claim 1, wherein at least one of the reinforcing ribs extends about a periphery of the ballistic shield.

8. A ballistic shield containment system for preventing fragments expelled from a first engine from adversely impacting a second engine, comprising:
   a ballistic shield;
   a space frame assembly surrounding said ballistic shield and adaptable to being attached to a bulkhead; and
   a ballistic shield support truss system including a plurality of separate support truss members, with each truss member attached at one end to said ballistic shield and attached at an opposite end to said space frame assembly, whereby the support truss system retains said ballistic shield at approximately a mid-point between said first and second engines;
   wherein opposite ends of at least one of the support truss members are joined to spherical bearings to prevent transmission of moment loads between the ballistic shield and the space frame assembly.

9. A containment member adaptable for use in preventing fragments expelled by a first engine from adversely impacting a second engine, comprising:
   a ballistic shield comprising a substantially flat panel member of rectangular configuration;
   the panel member being formed of a metallic material having an optimal combination of strength, ductility and low weight density; and
   the panel member having at least one reinforcing rib extending outwardly from at least one face of the panel member to reinforce the panel member against fragment penetration and excessive deformation.

10. The containment member according to claim 9, further comprising a plurality of reinforcing ribs that extend outwardly from opposite faces of the panel member, wherein the reinforcing ribs located adjacent a front end of the panel member extend toward a back end of the panel member to reinforce the panel member against fragment penetration and deformation.

11. The containment member according to claim 9, wherein a reinforcing lip is disposed on a periphery of the panel member and extends outwardly beyond both sides of the panel member in order to reinforce the panel member against fragment penetration and excessive deformation.

12. The containment member according to claim 9, wherein the panel member is formed of the titanium alloy Ti-6-4.

13. The ballistic shield according to claim 9, wherein the panel member has a thickness in the range of about 0.5 to 0.6 inches.

14. A ballistic shield containment system for preventing high speed fragments expelled from a first engine from impacting a second, adjacently disposed engine, comprising:
   a substantially rectangular ballistic shield panel member;
   a space frame assembly surrounding said panel member and at least a portion of the first and second engines, with said space frame including forward and aft space frame members each having a substantially horse collar configuration;
   a ballistic shield support truss system including a plurality of separate support truss members each having an end attached to the ballistic shield panel member and an opposite end attached to the aft frame space frame member; and a plurality of space frame truss members each attached to the aft space frame member and adaptable for attachment to a bulkhead wherein the forward and aft space frame members are attached to one another with elastomeric members compressed between the forward and aft space frame members to isolate and reduce shock forces from propagating through the space frame assembly.

15. The ballistic shield containment system according to claim 14, wherein a plurality of the support truss members and plurality of the space frame truss members are joined at either end to a spherical bearing to prevent the transmission of moment loads to and from the containment system.

16. The ballistic shield containment system according to claim 14, wherein the ballistic shield panel member includes a plurality of reinforcing ribs extending outwardly from each, opposite face of the panel member.

17. An engine support assembly and ballistic shield containment system adaptable for use with first and second adjacently disposed turboshaft engines connected through a common gearbox to a single propeller shaft, comprising:
   a space frame assembly including forward and aft horse collar shaped space frame members positioned adjacent to one another;
   an elasomeric assembly joining the forward and aft space frame members;

a space frame truss system attached to the aft space frame member and adaptable to being attached to a bulkhead;

a ballistic shield panel member disposed at approximately the mid-point between the first and second engines, including at least one reinforcing rib extending outwardly from at least one face of the panel member; and a ballistic shield support truss system including a plurality of separate support truss members extending between and attached to the ballistic shield panel member and the aft horse collar shaped space frame member for supporting the panel against fragment penetration from the damaged power section and excessive panel displacement of more than about 2–3 inches relative to the unaffected power section.

18. The support and containment system according to claim 17, wherein a plurality of the space truss members and a plurality of the support truss members are attached at either end to a spherical bearing to prevent the transmission of moment loads through the containment system.

19. The support and containment system according to claim 17, wherein at least one secondary attachment is bolted directly to the aft space frame to provide the containment system with dynamic frictional damping.

20. The support and containment system according to claim 19, wherein a plurality of secondary attachments are each directly bolted to the aft space frame to provide the containment system with dynamic frictional damping.

* * * * *